(12) United States Patent
Tashiro et al.

(10) Patent No.: US 11,654,844 B2
(45) Date of Patent: May 23, 2023

(54) ELECTRIC CONNECTION BOX AND WIRE HARNESS

(71) Applicant: Yazaki Corporation, Tokyo (JP)

(72) Inventors: Hiroki Tashiro, Shizuoka (JP); Ryouichi Yokoyama, Shizuoka (JP); Atsushi Sumida, Shizuoka (JP); Junya Masuda, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 425 days.

(21) Appl. No.: 17/111,455

(22) Filed: Dec. 3, 2020

(65) Prior Publication Data

US 2021/0170963 A1 Jun. 10, 2021

(30) Foreign Application Priority Data

Dec. 5, 2019 (JP) .............................. JP2019-220114

(51) Int. Cl.
| | | |
|---|---|---|
| *B60R 16/023* | (2006.01) | |
| *B60R 16/02* | (2006.01) | |
| *H01R 9/24* | (2006.01) | |
| *H02G 3/14* | (2006.01) | |
| *H02G 3/16* | (2006.01) | |

(52) U.S. Cl.
CPC ...... *B60R 16/0238* (2013.01); *B60R 16/0207* (2013.01); *H01R 9/24* (2013.01); *H02G 3/14* (2013.01); *H02G 3/16* (2013.01)

(58) Field of Classification Search
CPC ............ H02G 3/16; H02G 3/08; H02G 3/081; H02G 3/14; B60R 16/0238; B60R 16/0207; H01R 9/24
See application file for complete search history.

(56) References Cited

U.S. PATENT DOCUMENTS

| | | | |
|---|---|---|---|
| 2016/0351368 A1 | 12/2016 | Ikeda et al. | |
| 2017/0115649 A1* | 4/2017 | Richardson | .......... H05B 47/115 |
| 2019/0052028 A1* | 2/2019 | Nakagawa | ............. H01R 13/73 |
| 2019/0123537 A1* | 4/2019 | Nakashima | ............. H02G 3/083 |

FOREIGN PATENT DOCUMENTS

| | | |
|---|---|---|
| CN | 106207902 B | 5/2019 |
| JP | 2011-10514 A | 1/2011 |
| JP | 2015-126543 A | 7/2015 |
| JP | 2017-28766 A | 2/2017 |
| JP | 2017-127078 A | 7/2017 |
| JP | 6510303 B2 | 5/2019 |

* cited by examiner

*Primary Examiner* — Jean F Duverne

(74) *Attorney, Agent, or Firm* — Kenealy Vaidya LLP

(57) ABSTRACT

In an electric connection box, first and second holding structures between a casing and a terminal block outside the casing include locking portions provided on the side of an assembly surface of the casing, locked portions provided on the side of the terminal block and in which a relative movement of an installation target toward the side of an opening at an assembly completion position is locked by the locking portions, guide portions provided on the side of the assembly surface and extend along a direction of the relative movement between the locking portions and the locked portions in a state where the casing is attached to the installation target, and guided portions provided on the side of the terminal block and are guided from the side of the opening to the assembly completion position along the guide portions, respectively.

5 Claims, 13 Drawing Sheets

ELECTRIC CONNECTION BOX AND WIRE HARNESS

CROSS-REFERENCE TO RELATED APPLICATION(S)

The present application claims priority to and incorporates by reference the entire contents of Japanese Patent Application No. 2019-220114 filed in Japan on Dec. 5, 2019.

BACKGROUND OF THE INVENTION

1. Field of the Invention

The present invention relates to an electric connection box and a wire harness.

2. Description of the Related Art

Conventionally, in an electric connection box, a plurality of electric wires is electrically connected in a casing via electric parts such as electronic parts (relays and the like) and conductive parts (terminal fittings and the like), so that power is distributed between the electric wires and the electric wires are relayed. For example, the electric connection box is assembled into an installation target (vehicle such as an automobile). Japanese Patent Application Laid-open No. 2015-126543 discloses this type of electric connection box.

Incidentally, in the electric connection box, in a case where the electric parts required at a predetermined work such as an emergency response or a maintenance work are accommodated in the casing, when the electric parts are used, a worker should remove a cover of the casing. Therefore, conventionally, the electric parts are disposed outside the casing, so that workability during the predetermined work may be improved. However, when such a configuration is adopted, it is necessary not only to assemble the electric connection box and the electric wires drawn from the casing into the installation target, but also to assemble the electric parts for the predetermined work and the electric wires connected to the electric parts into the installation target. Therefore, this conventional configuration has room for improvement from the viewpoint of assembly workability at the time of manufacturing.

SUMMARY OF THE INVENTION

Therefore, an object of the present invention is to provide an electric connection box and a wire harness having excellent assembly workability.

In order to achieve the above mentioned object, an electrical connection box according to one aspect of the present invention includes an insulating casing; at least one internal electric part that is accommodated inside the casing and is electrically connected to a plurality of internal electric wires drawn from the inside to outside of the casing; a terminal block that is provided with at least one external electric part electrically connected to at least one external electric wire, and is assembled into an assembly surface in an outer wall of the casing; a first holding structure that is interposed between the assembly surface and a first outer wall surface disposed to face the assembly surface in the terminal block at an assembly completion position, and holds the terminal block on the assembly surface; and a second holding structure that is interposed between an erection wall erected from the assembly surface and a second outer wall surface disposed to face the erection wall in the terminal block at the assembly completion position, and holds the terminal block on the assembly surface, wherein the casing has a held portion to be attached to a holding portion of an installation target from an opening of the installation target, each of the first holding structure and the second holding structure includes a locking portion that is provided on the side of the assembly surface, a locked portion that is provided on the side of the terminal block and in which a relative movement toward the side of the opening at the assembly completion position is locked by the locking portion, a guide portion that is provided on the side of the assembly surface and extends along a direction of the relative movement between the locking portion and the locked portion in a state where the casing is attached to the installation target, and a guided portion that is provided on the side of the terminal block and is guided from the side of the opening to the assembly completion position along the guide portion, and at least one of a holding body having the locking portion and the guide portion in the first holding structure and a holding body having the locking portion and the guide portion in the second holding structure is disposed at a position visually recognized by a worker from the opening, in a state where the casing is attached to the installation target.

According to another aspect of the present invention, in the electrical connection box, it is desirable that the holding bodies of each of the first holding structure and the second holding structure are disposed at a position visually recognized by the worker from the opening, in a state where the casing is attached to the installation target.

According to still another aspect of the present invention, in the electrical connection box, it is desirable that the holding bodies of each of the first holding structure and the second holding structure are provided in an erection body erected from the assembly surface, and the erection body has the erection wall, and is formed to have a strength that is higher than a required strength under a usage environment and enables breakage during a dismantling work for separating the terminal block from the casing.

In order to achieve the above mentioned object, a wire harness according to still another aspect of the present invention includes an insulating casing; a plurality of internal electric wires; at least one internal electric part that is accommodated inside the casing and is electrically connected to the plurality of internal electric wires drawn from the inside to outside of the casing; at least one external electric wire; a terminal block that is provided with at least one external electric part electrically connected to the at least one external electric wire and is assembled into an assembly surface in an outer wall of the casing; a first holding structure that is interposed between the assembly surface and a first outer wall surface disposed to face the assembly surface in the terminal block at an assembly completion position and holds the terminal block on the assembly surface; and a second holding structure that is interposed between an erection wall erected from the assembly surface and a second outer wall surface disposed to face the erection wall in the terminal block at the assembly completion position and holds the terminal block on the assembly surface, wherein the casing has a held portion to be attached to a holding portion of an installation target from an opening of the installation target, each of the first holding structure and the second holding structure includes a locking portion that is provided on the side of the assembly surface, a locked portion that is provided on the side of the terminal block and in which a relative movement toward the side of the opening at the assembly completion position is locked by the locking portion, a guide portion that is provided on the side of the assembly surface and extends along a direction of the relative movement between the locking portion and the locked portion in a state where the casing is attached to the installation target, and a guided portion that is provided on the side of the terminal block and is guided from the side of the opening to the assembly completion position along the guide portion, and at least one of a holding body having the locking portion and the guide portion in the first holding structure and a holding body having the locking portion and the guide portion in the second holding structure is disposed at a position visually recognized by a worker from the opening, in a state where the casing is attached to the installation target.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of an electric connection box and a wire harness according to the present invention will be described in detail on the basis of the drawings. Note that the present invention is not limited by these embodiments.

Embodiment

One of the embodiments of the electric connection box and the wire harness according to the present invention will be described on the basis of FIGS. 1 to 13.

Figure 1:
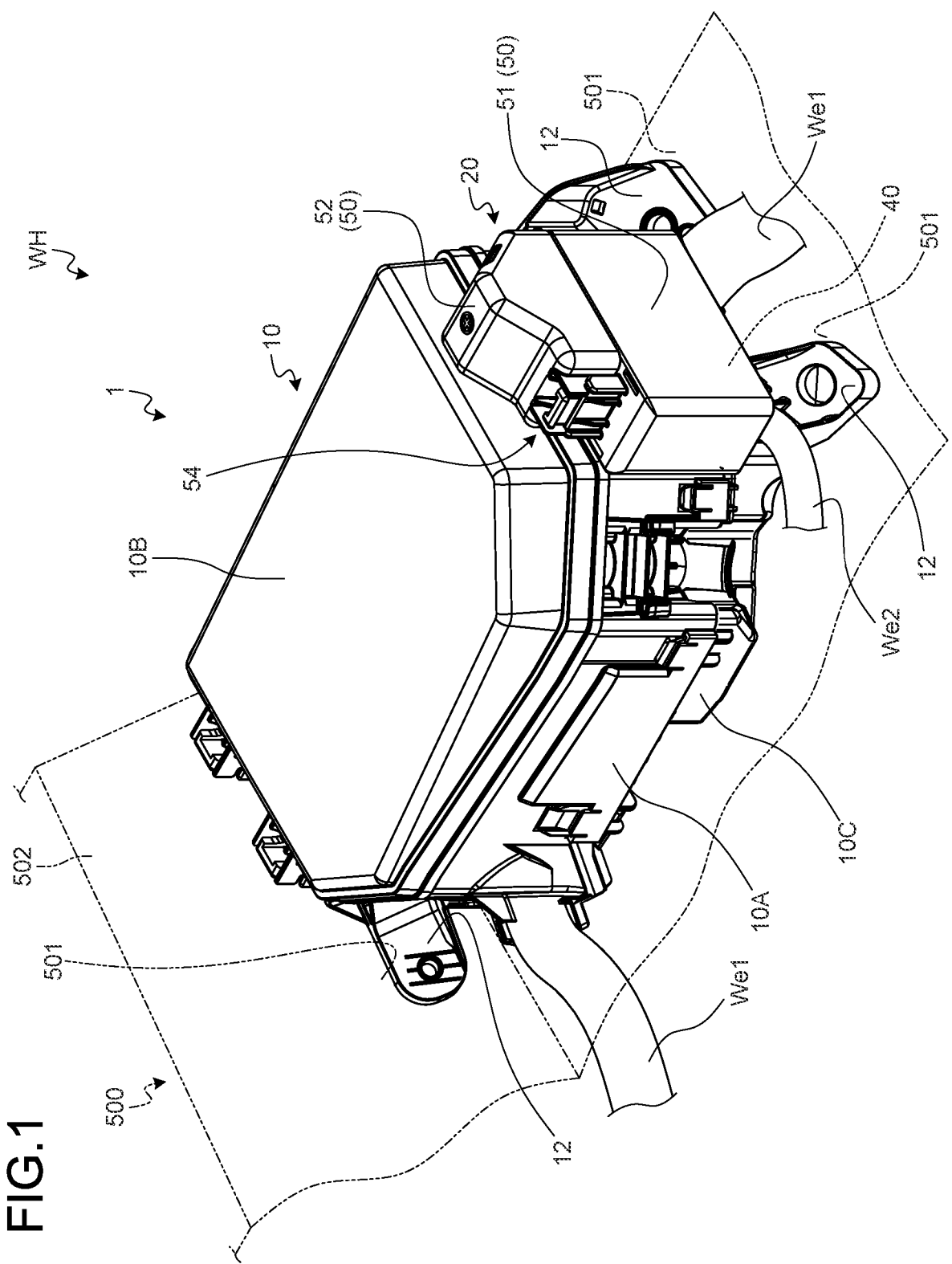
FIG. 1 is a perspective view illustrating an electric connection box and a wire harness according to an embodiment.
Figure 2:
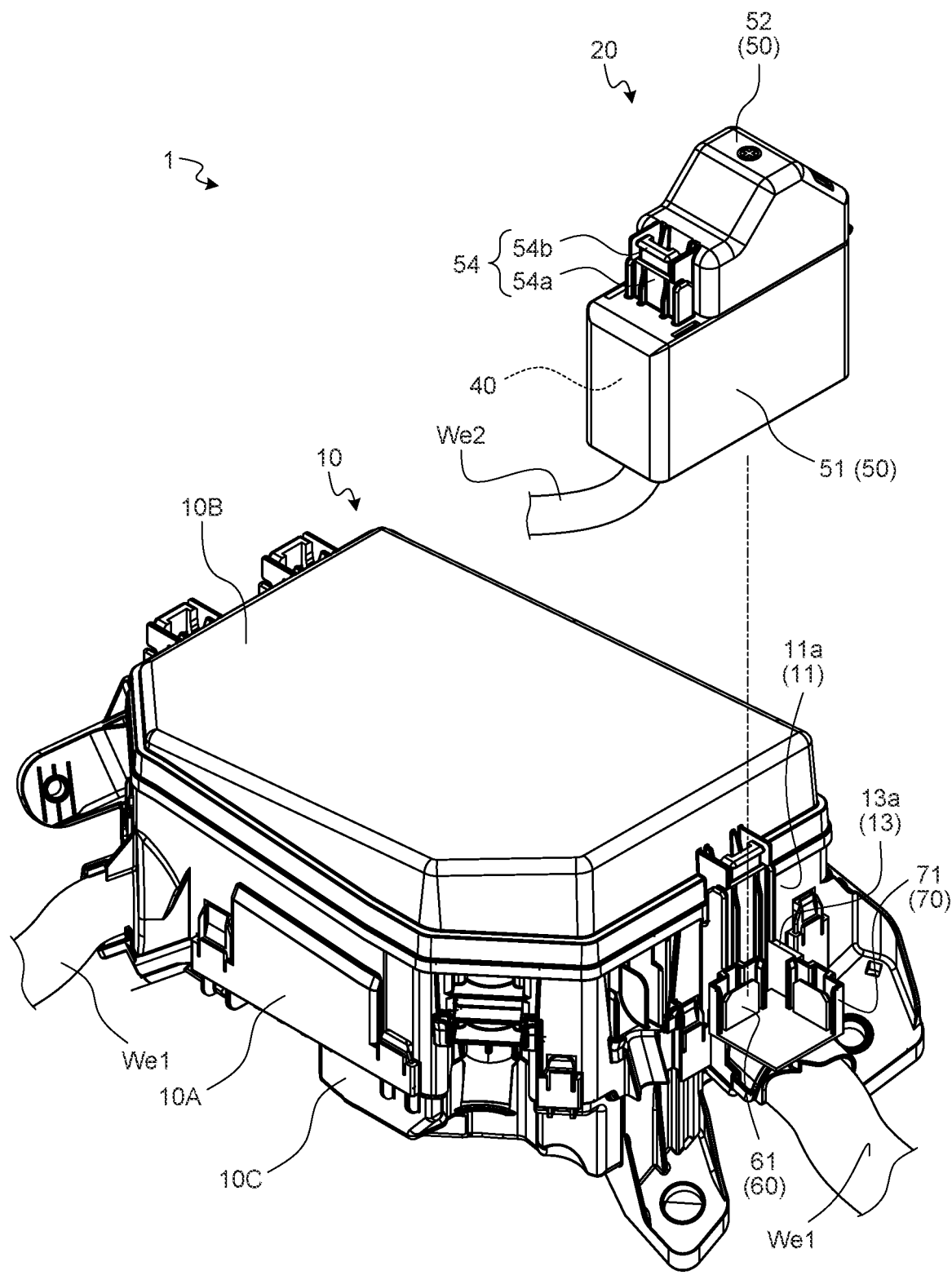
FIG. 2 is an exploded perspective view of the electric connection box with the side of a casing and the side of a terminal block separated.
Figure 3:
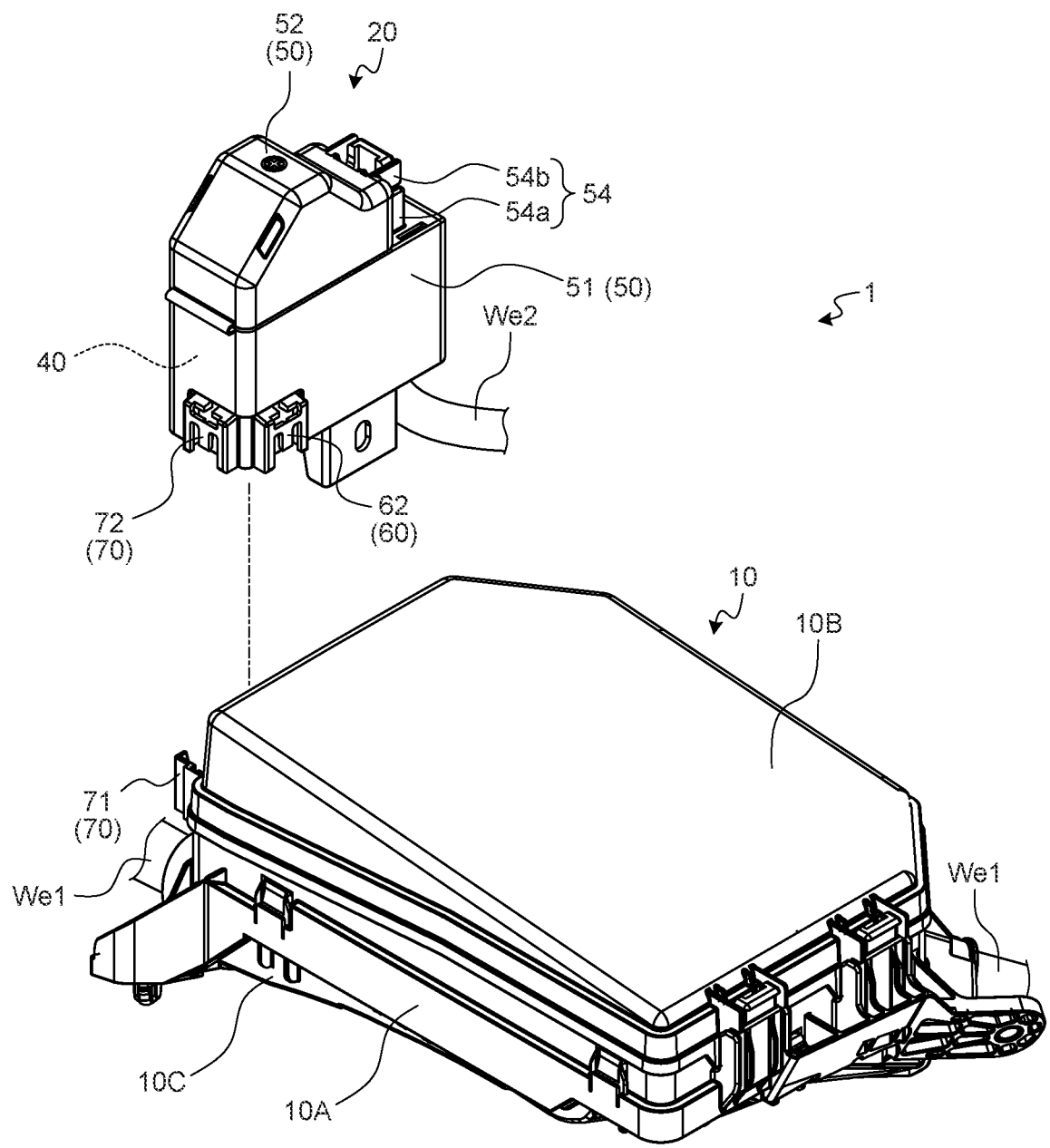
FIG. 3 is an exploded perspective view of the electric connection box with the side of the casing and the side of the terminal block separated, and illustrates a state of the electric connection box viewed from another angle.

Reference numeral 1 in FIGS. 1 to 3 indicates an electric connection box of the present embodiment. Further, reference character WH in FIG. 1 indicates a wire harness of the present embodiment including an electric connection box 1.

The electric connection box 1 of the present embodiment includes an insulating casing 10 and at least one electric part (hereinafter, referred to as "internal electric parts" (not illustrated)) accommodated inside the casing 10 (FIGS. 1 to 3). The internal electric parts are electrically connected to a plurality of electric wires (hereinafter, referred to as "internal electric wires") We1 inside the casing 10. The electric connection box 1 further includes a terminal block 20 disposed outside the casing 10 (FIGS. 1 to 3). The terminal block 20 is assembled into an assembly surface 11a in an outer wall 11 of the casing 10 (FIG. 2). The terminal block 20 is provided with at least one electric part (hereinafter, referred to as an "external electric part") 30 electrically connected to at least one electric wire (hereinafter, referred to as an "external electric wire") We2 (FIGS. 4 to 7). The electric connection box 1 forms the wire harness WH together with the plurality of internal electric wires We1 drawn from the inside to the outside of the casing 10 and at least one external electric wire We2 drawn from the terminal block 20. Note that the internal electric wire We1 in the drawings shows a plurality of internal electric wires bundled with exterior parts (a corrugated tube and the like), a protective tape, or the like.

Here, the internal electric part and the external electric part 30 refer to an electronic part or a conductive part. The electronic part refers to, for example, a circuit protection part such as a relay or a fuse. Here, electronic devices such as a circuit board and an electronic control unit (so-called ECU) are also considered as a form of electronic parts. Further, the conductive part refers to a terminal fitting, a connector, a bus bar, or the like.

The internal electric part is electrically connected to a connection target via the internal electric wire We1 drawn to the outside of the casing 10. The connection target refers to a power supply such as a secondary battery, a load such as an electric device (an actuator or the like), a sensor, or the like. In the electric connection box 1 of this example, for example, a certain internal electric wire We1 is electrically connected to the power supply, and another internal electric wire We1 is electrically connected to the load, so that the power supply and the load are electrically connected via the internal electric part.

The casing 10 in which the internal electric parts are accommodated is formed of an insulating material such as a synthetic resin. The casing 10 of this example includes a cylindrical frame 10A that has both ends opened, a first cover 10B that closes one opening of the frame 10A, and a second cover 10C that closes the other opening of the frame 10A (FIGS. 1 to 3). In the casing 10, each of the first cover 10B and the second cover 10C is detachably assembled into the frame 10A via a lock mechanism (for example, it locks the two parts with locking claws or the like in an assembled state). In addition, in the casing 10, the internal electric parts are accommodated in an internal space surrounded by the frame 10A, the first cover 10B, and the second cover 10C in the assembled state, and the internal electric wires We1 electrically connected to the internal electric parts are drawn from the internal space to the outside. The casing 10 has a held portion 12 to be attached to a holding portion 501 of an installation target 500 from an opening 502 of the installation target 500 (FIG. 1). In the casing 10 of this example, the first cover 10B is disposed vertically above the frame 10A and on the side of the opening 502 of the installation target 500, and the second cover 10C is disposed vertically below the frame 10A. For example, the held portion 12 is provided in the second cover 10C and is attached to the holding portion 501 disposed vertically below the opening 502. The installation target 500 illustrated here is a structure of a vehicle body in a vehicle such as an automobile. For example, the electric connection box 1 is installed in an engine compartment of the vehicle body.

On the other hand, the terminal block 20 may accommodate the external electric part 30 inside a casing (different from the casing 10), and may cause a holding member such as a so-called block to hold the external electric part 30. For example, the external electric part 30 illustrated here refers to an electric part for a predetermined work required at the predetermined work such as an emergency response or a maintenance work. Here, as the external electric part 30, a relief terminal for supplying electricity to another vehicle is mentioned as an example, and one external electric wire We2 drawn from the terminal block 20 is electrically connected to the power supply. Therefore, the terminal block 20 includes a holding member 40 that holds the external electric part 30 to be visually recognized by a worker, and a terminal cover 50 that covers the holding member 40 together with the relief terminal 30 from the outside (FIGS. 1 to 7). The terminal block 20 is held in the casing 10 by a first holding structure 60 and a second holding structure 70 (FIGS. 2 and 3).

Figure 6:
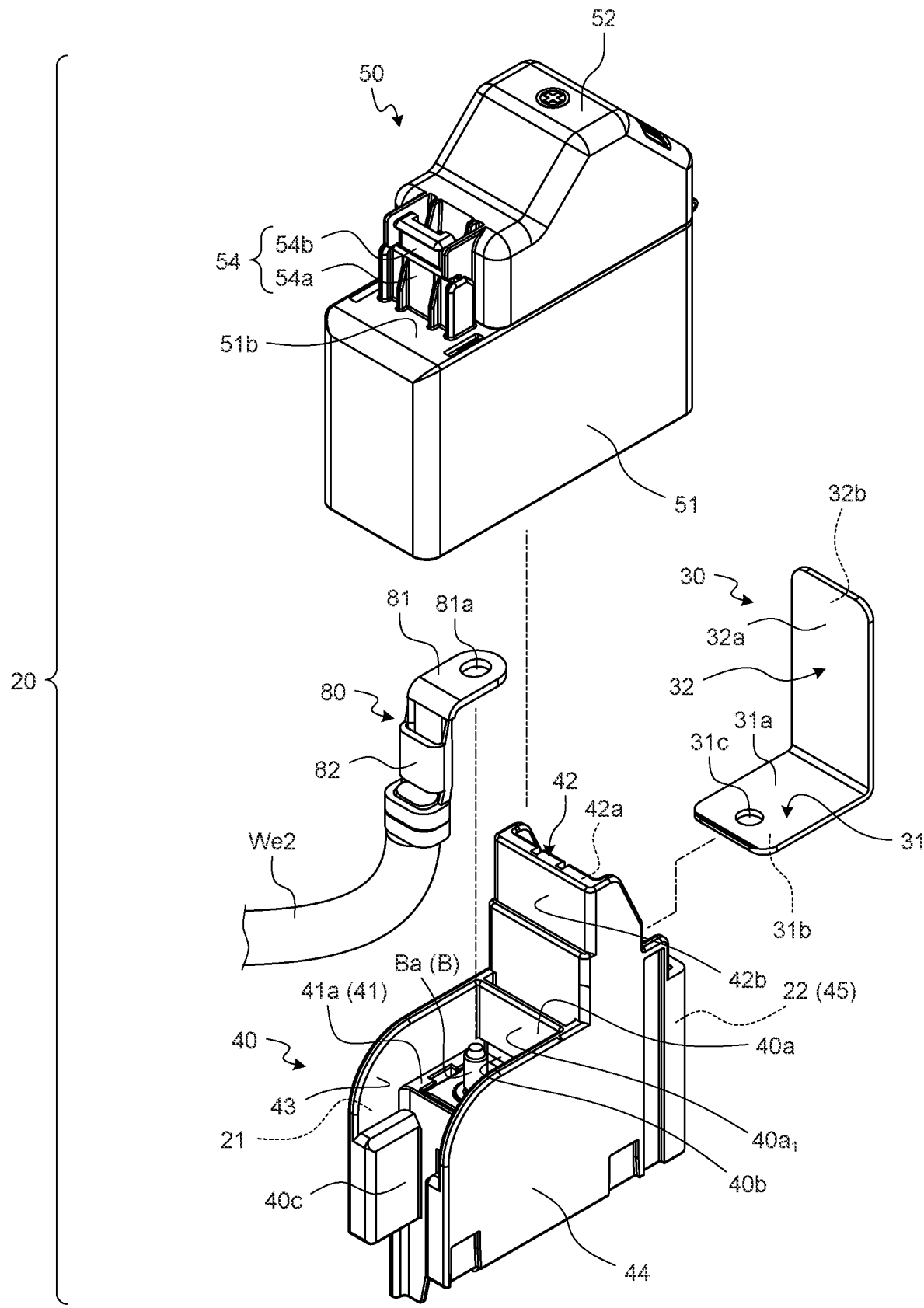
FIG. 6 is an exploded perspective view of the terminal block.
Figure 7:
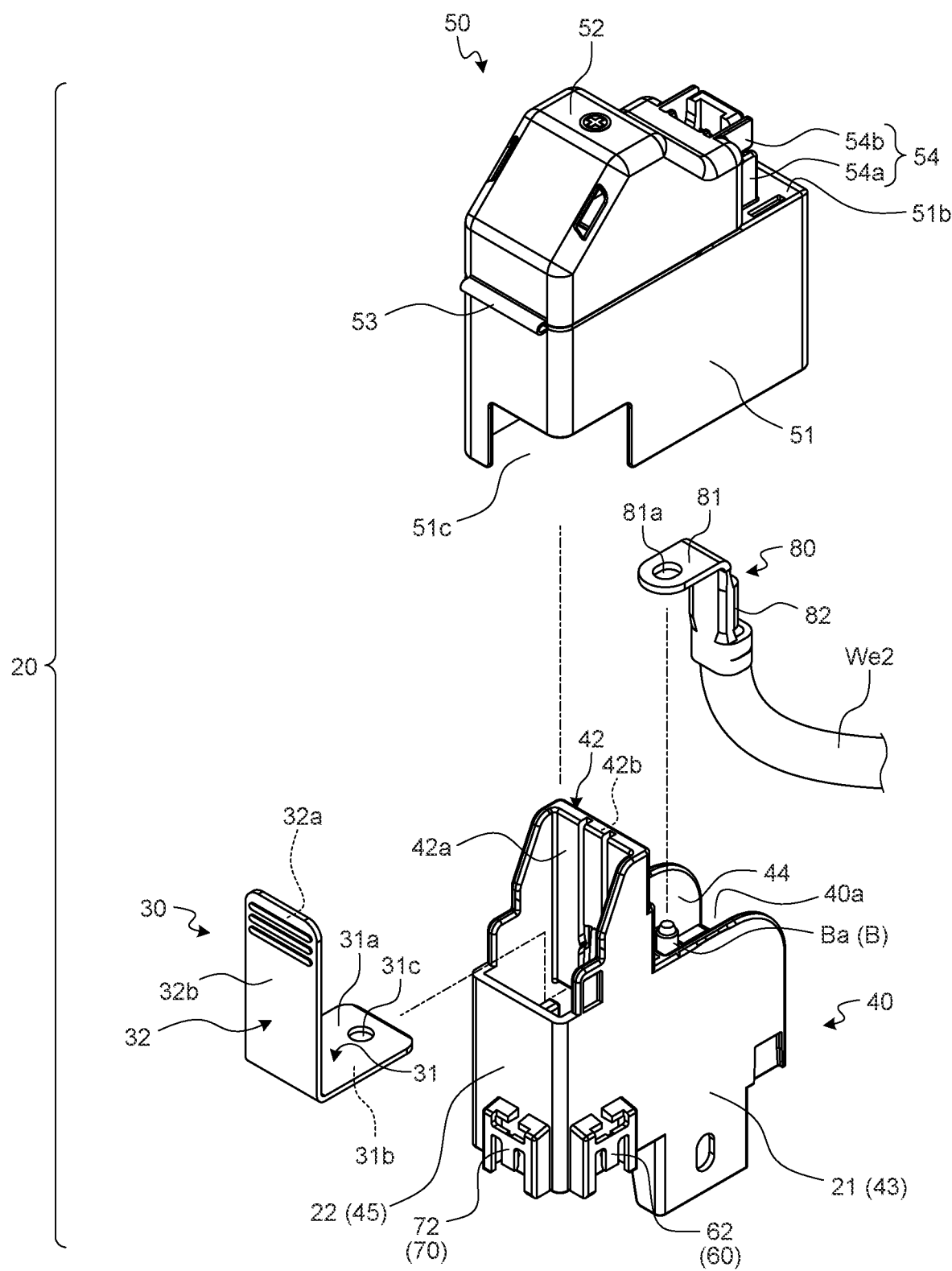
FIG. 7 is an exploded perspective view of the terminal block viewed from another angle.

In the relief terminal 30 illustrated here, a rectangular and slice-shaped first connector 31 and a rectangular and slice-shaped second connector 32 intersect with each other (FIGS. 6 and 7). The relief terminal 30 of this example is formed as an L-shaped terminal fitting in which the first connector 31 and the second connector 32 are caused to be orthogonal to each other. In the relief terminal 30, for convenience, the side sandwiched between the first connector 31 and the second connector 32 is referred to as the inside, and the side opposite to this is referred to as the outside. Therefore, in the relief terminal 30, the first connector 31 and the second connector 32 have rectangular inner wall surfaces 31a and 32a on the inside and rectangular outer wall surfaces 31b and 32b on the outside, respectively (FIGS. 6 and 7).

In the relief terminal 30, the first connector 31 is physically and electrically connected to the external electric wire We2, so that the first connector 31 is electrically connected to the power supply via the external electric wire We2. Here, a terminal fitting 80 is physically and electrically connected to a terminal of the external electric wire We2, and the relief terminal 30 and the external electric wire We2 are electrically connected via the terminal fitting 80 (FIGS. 6 and 7). The terminal fitting 80 of this example is an L-shaped terminal fitting in which slice-shaped first and second connectors 81 and 82 are caused to intersect with each other, and the terminal of the external electric wire We2 is crimped and fixed to the second connector 82. The relief terminal 30 and the terminal fitting 80 are physically and electrically connected by screwing and fixing the first connector 31 and the first connector 81. Therefore, through-holes 31c and 81a into which a male screw portion Ba of a male screw B is inserted are formed in the first connector 31 and the first connector 81, respectively (FIGS. 6 and 7). A female screw (not illustrated) is attached to the male screw B.

Further, in the relief terminal 30, the second connector 32 is sandwiched between clips (not illustrated) of a terminal of a booster cable, so that the second connector 32 is electrically connected to the booster cable.

The holding member 40 and the terminal cover 50 are formed of an insulating material such as synthetic resin. The terminal block 20 illustrated here is formed to accommodate the relief terminal 30 inside by the holding member 40 and the terminal cover 50 and to draw the external electric wire We2 from the inside to the outside. In the terminal block 20 of this example, the relief terminal 30 and the terminal fitting 80 are held by the holding member 40, and the relief terminal 30, the terminal fitting 80, and the holding member 40 are covered from the outside by the terminal cover 50.

The holding member 40 has a terminal installation portion 41 into which the outer wall surface 31b of the first connector 31 is assembled, and a clip installation portion 42 in which the inner wall surface 32a of the second connector 32 is disposed to face the clip installation portion 42 and which is sandwiched between the clips of the booster cable together with the second connector 32 (FIG. 6). In the holding member 40, the terminal installation portion 41 is formed as a bottom portion of a first concave portion 40a. Further, in the holding member 40, the clip installation portion 42 is formed in a projection state.

The terminal installation portion 41 of this example has a terminal installation surface 41a on which the outer wall surface 31b of the first connector 31 is mounted (FIG. 6). A stud bolt as the male screw B is assembled into the terminal installation portion 41 with the male screw portion Ba projected from the terminal installation surface 41a. For example, in the terminal installation portion 41, the male screw B is assembled from the side opposite to the terminal installation surface 41a. Therefore, the terminal installation portion 41 is provided with, for example, a locking claw that hooks on a square head portion of the assembled male screw B and locks the head portion.

The clip installation portion 42 of this example is projected along a side wall $40a_1$ of the first concave portion 40a and toward the side of a free end of the male screw portion Ba, in a direction orthogonal to the terminal installation surface 41a of the terminal installation portion 41 (FIG. 6). The clip installation portion 42 is formed in a plate shape having a first wall surface 42a in which the inner wall surface 32a of the second connector 32 is disposed to face the first wall surface 42a, and a second wall surface 42b which is provided along the side wall $40a_1$ of the first concave portion 40a (FIGS. 6 and 7). The clips of the booster cable sandwich the second connector 32 and the clip installation portion 42 from the side of the outer wall surface 32b and the side of the second wall surface 42b.

The side wall $40a_1$ of the first concave portion 40a is provided with a through-hole 40b into which the first connector 31 is inserted from the side of the first wall surface 42a to the side of the second wall surface 42b of the clip installation portion 42 (FIG. 6). In the holding member 40, by inserting the first connector 31 into the through-hole 40b from the side of the first wall surface 42a, the outer wall surface 31b of the first connector 31 is mounted on the terminal installation surface 41a of the terminal installation portion 41. In addition, in the holding member 40, the male screw B is assembled into the terminal installation portion 41 from the side opposite to the terminal installation surface 41a, so that the male screw portion Ba is inserted into the through-hole 31c of the first connector 31. Then, in the holding member 40, the first connector 81 of the terminal fitting 80 is mounted on the inner wall surface 31a of the first connector 31 while the male screw portion Ba is inserted into the through-hole 81a. In the holding member 40, the first connector 31 and the first connector 81 are screwed and fixed by screwing a female screw (not illustrated) into the male screw portion Ba.

The holding member 40 has a second concave portion 40c that is orthogonally connected to the first concave portion 40a (FIG. 6). In the holding member 40, the second connector 82 of the terminal fitting 80 is disposed in the second concave portion 40c, so that the external electric wire We2 is disposed along the second concave portion 40c.

The holding member 40 has a first outer wall 43 and a second outer wall 44 that are disposed to face each other at intervals, sandwich the terminal installation portion 41 and the clip installation portion 42, and form side walls of the facing arrangement state in the first concave portion 40a and the second concave portion 40c (FIGS. 6 and 7). Each of the first outer wall 43 and the second outer wall 44 is more projected than the first wall surface 42a of the clip installation portion 42. The holding member 40 is provided with a third outer wall 45 that connects ends of the first outer wall 43 and the second outer wall 44 on the projection direction side (FIGS. 6 and 7). The third outer wall 45 has a plane disposed orthogonally to the respective planes of the first outer wall 43 and the second outer wall 44.

The terminal cover 50 is formed so as to cover the holding member 40 together with the relief terminal 30 and the terminal fitting 80 from the side of the clip installation portion 42.

Figure 4:
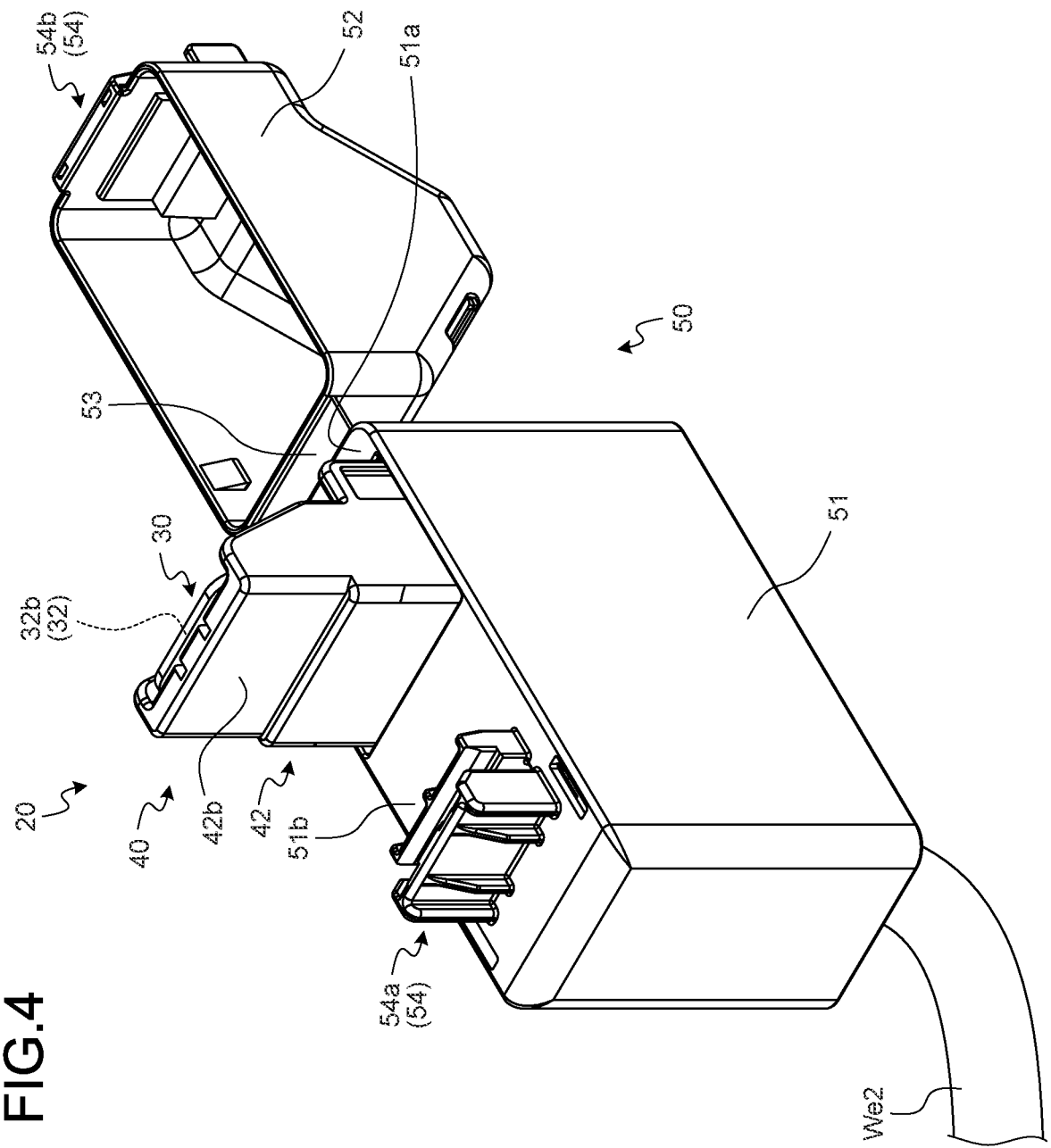
FIG. 4 is a perspective view illustrating an opened state of a second cover body in the terminal block.
Figure 5:
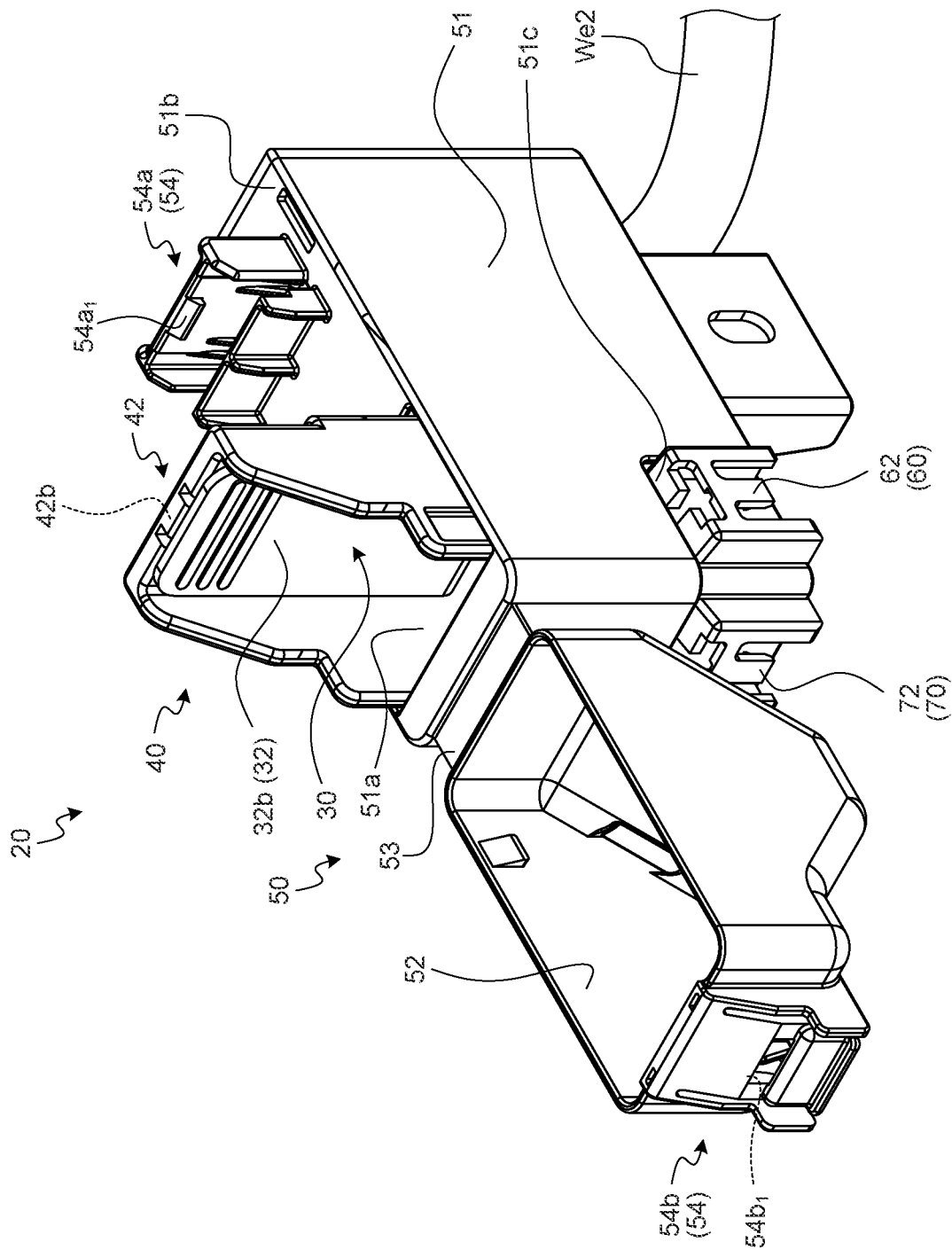
FIG. 5 is a perspective view of the opened state of the second cover body in the terminal block as viewed from another angle.

The terminal cover 50 of this example has a square cylindrical first cover body 51 with one end opened, and accommodates the holding member 40 from the opening (FIGS. 6 and 7). At the other end of the first cover body 51 in a cylindrical axis direction, a wall body 51b provided with a through-hole 51a is provided (FIGS. 4 and 5). The through-hole 51a is a hole into which the clip installation portion 42 and the second connector 32 of the relief terminal 30 are inserted, and the clip installation portion 42 and the second connector 32 are more projected than the wall body 51b in a state where the holding member 40 is accommodated.

The terminal cover 50 of this example has a second cover body 52 that at least closes the through-hole 51a of the wall body 51b and covers the clip installation portion 42 and the second connector 32 more projected than the wall body 51b (FIGS. 1 to 7). The second cover body 52 is formed in a square cylindrical shape with one end opened, and is attached to the first cover body 51 so as to be openable and closable. In the terminal cover 50 of this example, the first cover body 51 and the second cover body 52 are connected via a living hinge 53, and the second cover body 52 is rotated with respect to the first cover body 51 about the living hinge 53 (FIGS. 4, 5, and 7). FIGS. 1 to 3 illustrate a closed state of the second cover body 52 with respect to the first cover body 51. FIGS. 4 and 5 illustrate an opened state of the second cover body 52 with respect to the first cover body 51.

The terminal cover 50 of this example includes a holding structure 54 that holds the second cover body 52 in a closed state with respect to the first cover body 51 (FIGS. 1 to 7). The holding structure 54 includes a first holding body 54a provided in the first cover body 51 and a second holding body 54b provided in the second cover body 52 (FIGS. 2 to 7). Here, the first holding body 54a is provided in a projection state with respect to the wall body 51b, and the second holding body 54b is provided in a projection state with respect to the outer wall surface of the second cover body 52. The first holding body 54a has a locking portion $54a_1$ (FIG. 5). On the other hand, the second holding body 54b has a locked portion $54b_1$ in which the relative movement toward the opened state at the position in the closed state is locked by the locking portion 54a, (FIG. 5). One of the locking portion 54a, and the locked portion $54b_1$ of this example is formed as a claw portion, and the other is formed as a locking wall for hooking the claw portion. Here, the locking portion $54a_1$ is formed as the claw portion, and the locked portion $54b_1$ is formed as the locking wall.

As illustrated above, the terminal block 20 is assembled into the assembly surface 11a in the outer wall 11 of the casing 10. In this example, a part of the outer wall surface of the frame 10A is used as the assembly surface 11a. Therefore, the electric connection box 1 includes the first holding structure 60 and the second holding structure 70 that hold the terminal block 20 on the assembly surface 11a at the assembly completion position of the casing 10 and the terminal block 20.

The terminal block 20 has a first outer wall surface 21 disposed so as to face the assembly surface 11a at intervals (FIGS. 6 and 7). The first holding structure 60 is interposed between the assembly surface 11a and the first outer wall surface 21 at the assembly completion position. On the other hand, the casing 10 has an erection wall 13a erected from the assembly surface 11a (FIGS. 2 and 8 to 10). In addition, the terminal block 20 has a second outer wall surface 22 disposed so as to face the erection wall 13a at intervals (FIGS. 6 and 7). The second holding structure 70 is interposed between the erection wall 13a and the second outer wall surface 22 at the assembly completion position.

The first outer wall surface 21 and the second outer wall surface 22 of this example are planes connected to each other in an orthogonal state. The first outer wall surface 21 and the second outer wall surface 22 may use the outer wall surface of the terminal cover 50, or may use the outer wall surface of the holding member 40 exposed from a notch of the terminal cover 50. Here, the outer wall surface of the holding member 40 exposed from a notch 51c of the first cover body 51 is used as the first outer wall surface 21 and the second outer wall surface 22 (FIGS. 5 and 7). In this example, the outer wall surface of the first outer wall 43 is used as the first outer wall surface 21, and the outer wall surface of the third outer wall 45 is used as the second outer wall surface 22.

The first holding structure 60 and the second holding structure 70 include first holding bodies 61 and 71 (FIGS. 2, 8, and 9) provided on the side of the assembly surface 11a and second holding bodies 62 and 72 (FIGS. 3 and 11) provided on the side of the terminal block 20, respectively. The first holding structure 60 engages the first holding body 61 and the second holding body 62 to hold the terminal block 20 in the casing 10 at the assembly completion position. Further, the first holding structure 60 guides the first holding body 61 and the second holding body 62 to the assembly completion position. Further, the second holding structure 70 engages the first holding body 71 and the second holding body 72 to hold the terminal block 20 in the casing 10 at the assembly completion position. Further, the second holding structure 70 guides the first holding body 71 and the second holding body 72 to the assembly completion position. That is, each of the first holding structure 60 and the second holding structure 70 illustrated here is configured as a through-lock structure.

Here, the first holding bodies 61 and 71 are provided in a projection state with respect to the assembly surface 11a.

Therefore, the casing 10 is provided with an erection body 13 erected from the assembly surface 11a (FIGS. 2 and 8 to 10). The erection body 13 has the above-mentioned erection wall 13a. The first holding bodies 61 and 71 are provided in the erection body 13 so as to be projected with respect to the assembly surface 11a.

Figure 8:
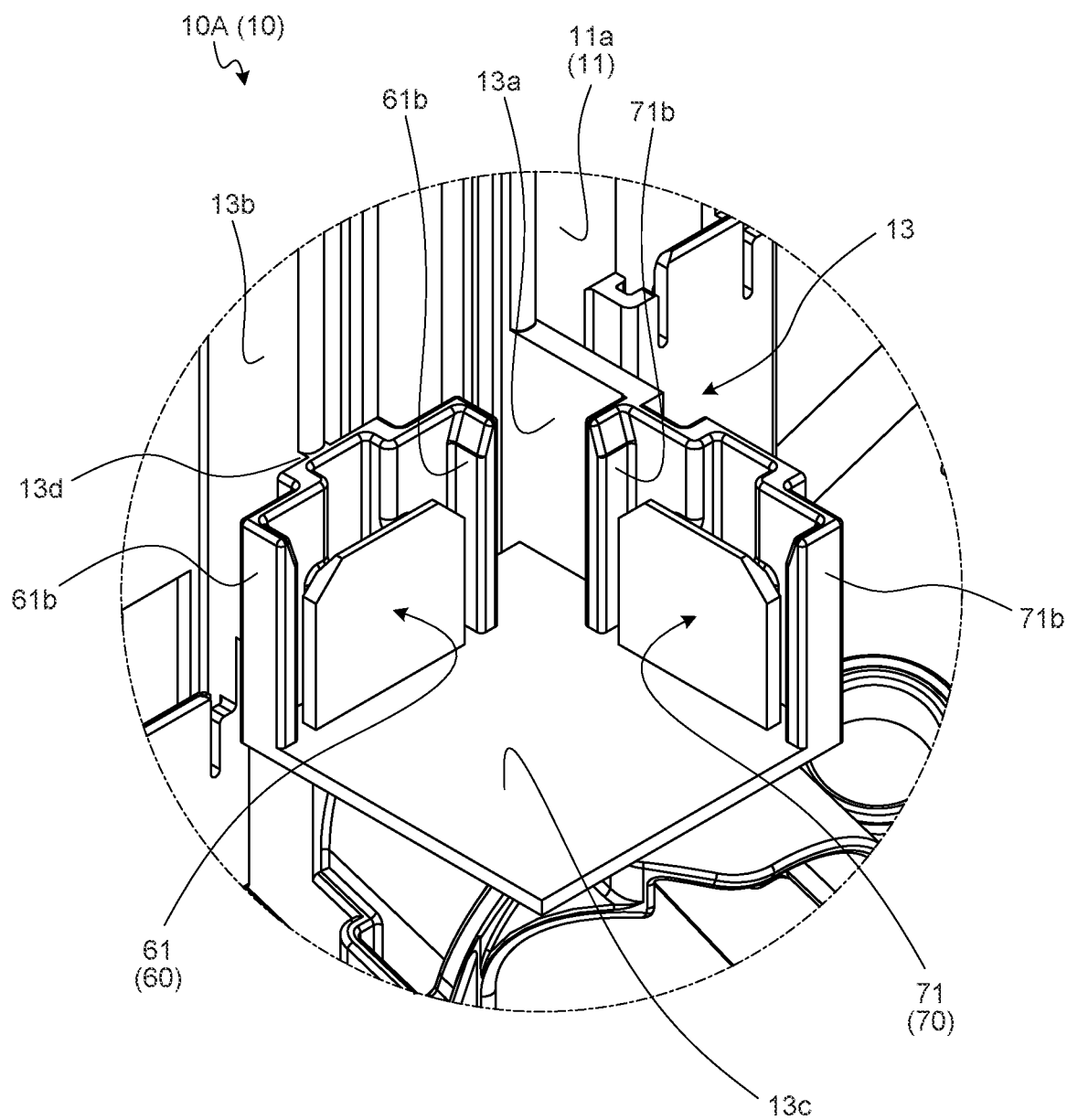
FIG. 8 is a perspective view illustrating first holding bodies of a first holding structure and a second holding structure.
Figure 9:
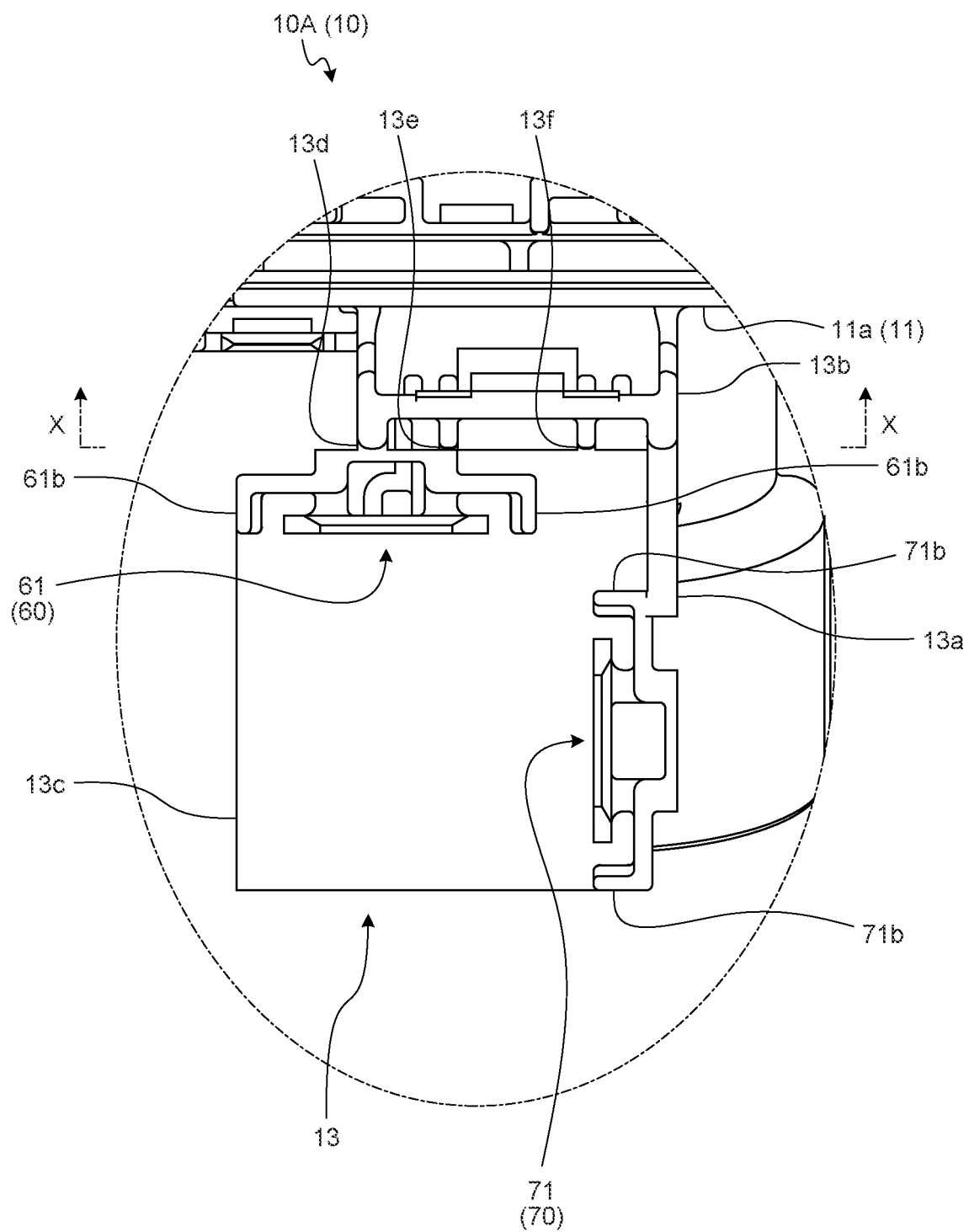
FIG. 9 is a plan view illustrating the first holding bodies of the first holding structure and the second holding structure.
Figure 10:
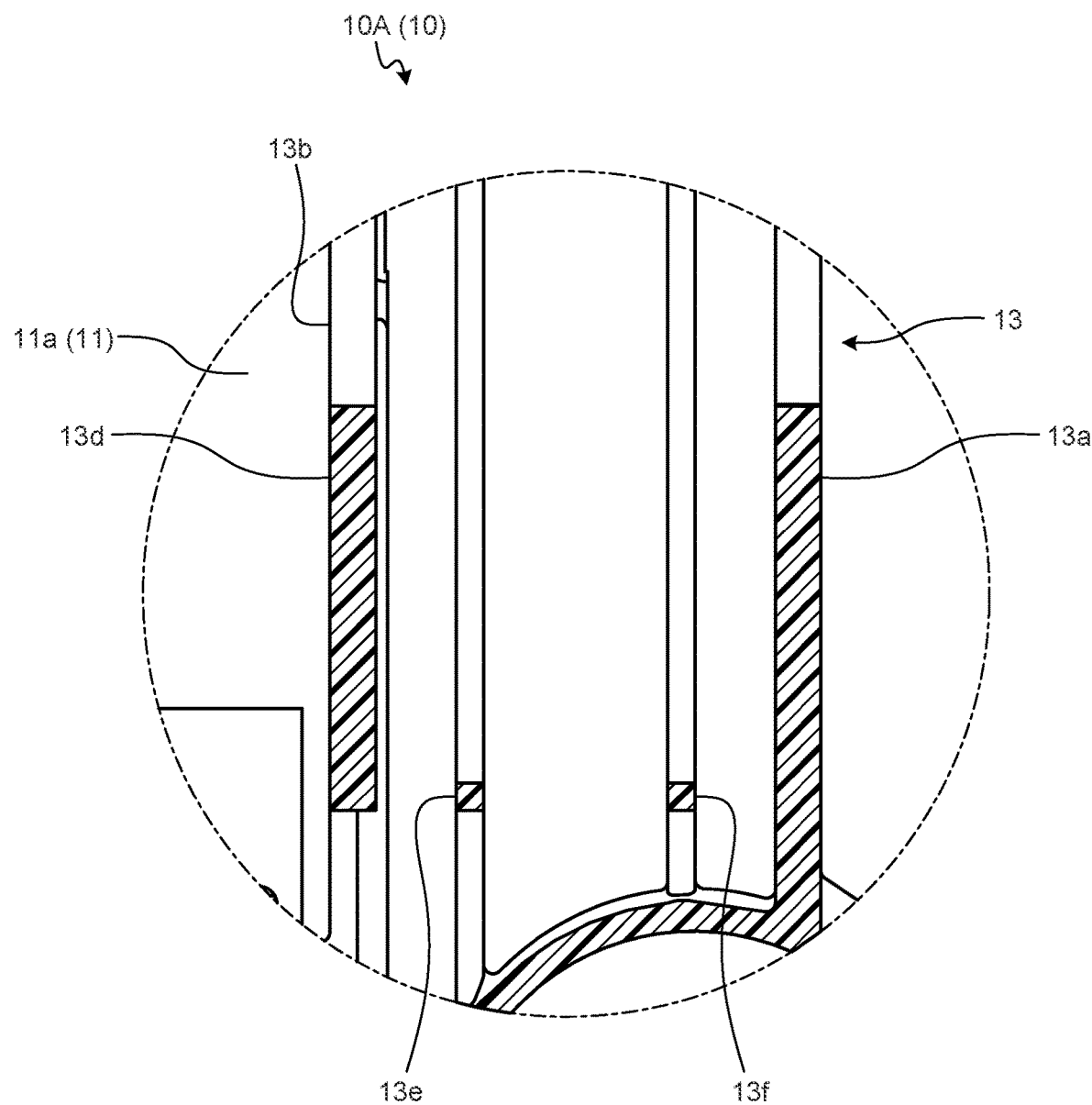
FIG. 10 is a cross-sectional view taken along line X-X of FIG. 9.

The erection body 13 has a bulging portion 13b bulging from the assembly surface 11a (FIGS. 8 to 10). A part of the bulging portion 13b forms a part of the erection wall 13a on the side of the assembly surface 11a. The erection wall 13a of this example is vertically installed from the flat assembly surface 11a and is formed in a flat plate shape. Further, the erection body 13 has a bottom wall 13c with a flat plate shape that is connected to an end of each of the erection wall 13a and the bulging portion 13b on the vertically lower side (the side of the second cover body 52), and is disposed orthogonally to a plane of each of the assembly surface 11a and the erection wall 13a (FIGS. 8 and 9).

The first holding body 61 is disposed in parallel to the plane of the assembly surface 11a. In the first holding body 61, the side of the assembly surface 11a is connected to the bulging portion 13b by a first connecting portion 13d, and the vertically lower side (the side of the second cover body 52) is connected in a state of being mounted on the bottom wall 13c (FIGS. 8 and 9). The first holding body 71 is disposed in parallel to the plane of the erection wall 13a. In the first holding body 71, the vertically lower side (the side of the second cover body 52) is connected in a state of being mounted on the bottom wall 13c (FIGS. 8 and 9).

The second holding bodies 62 and 72 are provided in a projection state with respect to the first outer wall surface 21 and the second outer wall surface 22 of the holding member 40, respectively (FIG. 7).

Figure 11:
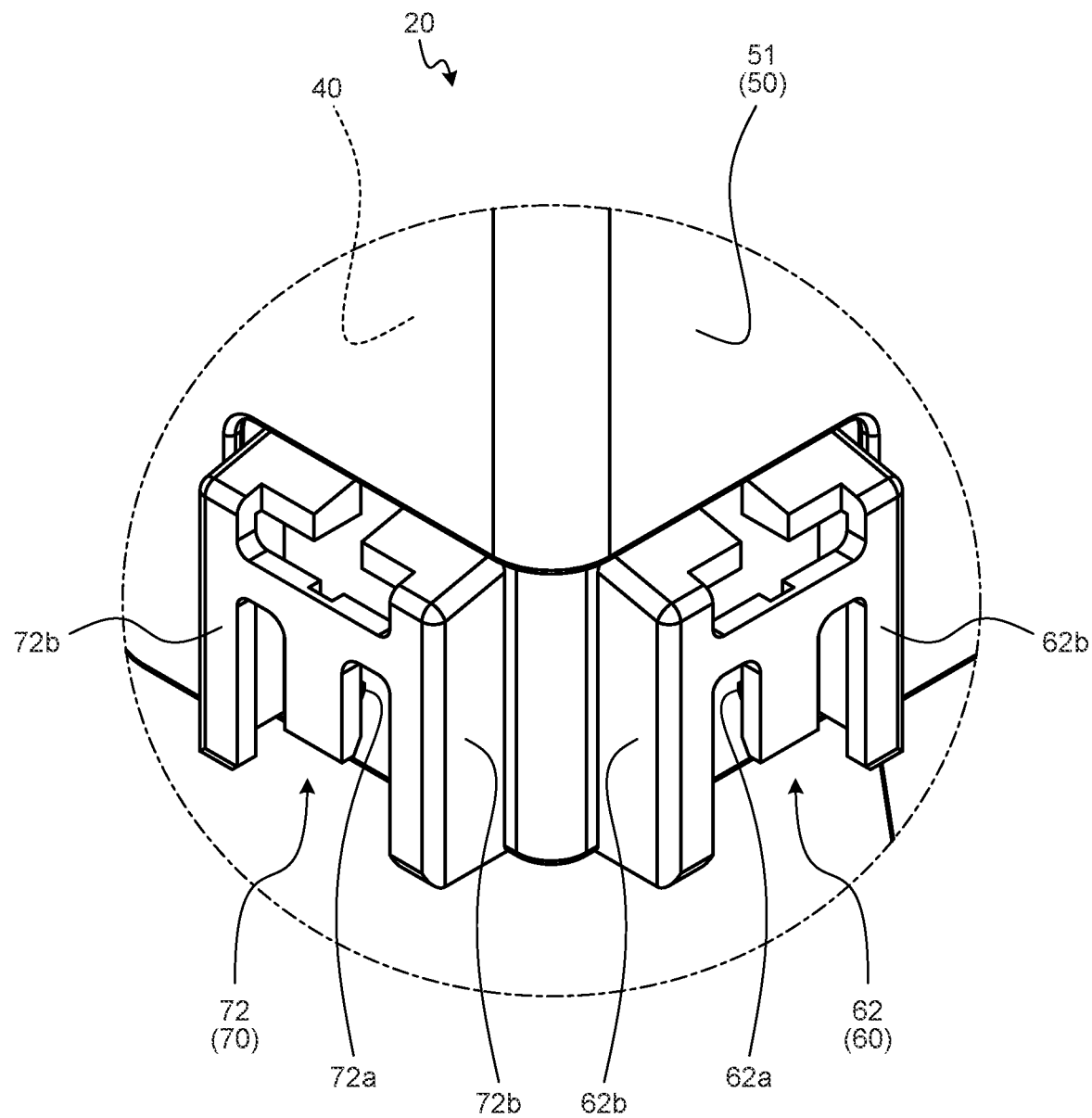
FIG. 11 is a perspective view illustrating second holding bodies of the first holding structure and the second holding structure.
Figure 12:
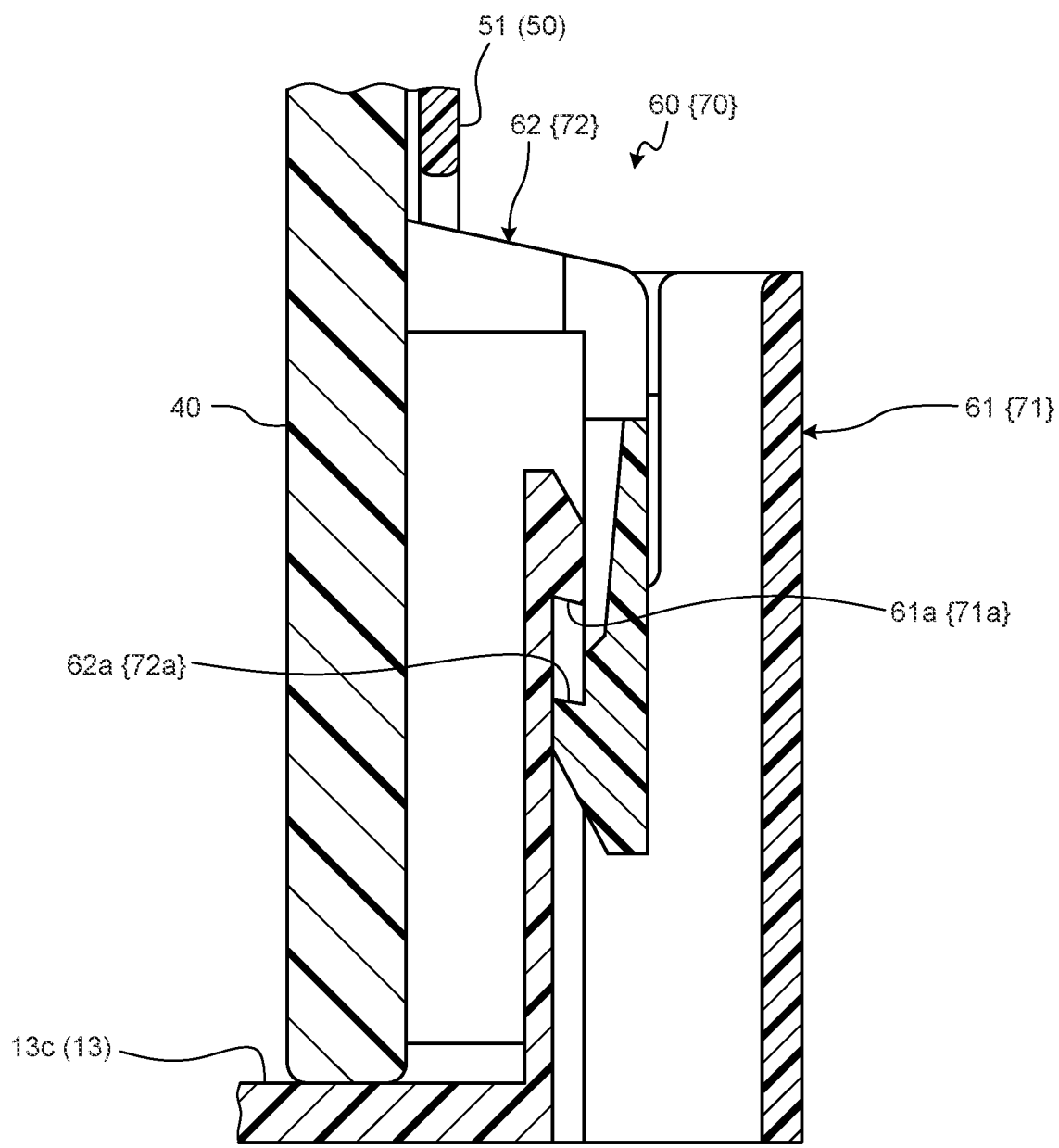
FIG. 12 is a cross-sectional view explaining locking portions and locked portions of the first holding structure and the second holding structure.

Specifically, the first holding bodies 61 and 71 have locking portions 61a and 71a, respectively (FIG. 12). In addition, the second holding bodies 62 and 72 have locked portions 62a and 72a in which the relative movement toward the side of the opening 502 at the assembly completion position is locked by the locking portions 61a and 71a, respectively (FIGS. 11 and 12). One of the locking portions 61a and 71a and the locked portions 62a and 72a of this example is formed as claw portions, and the other is formed as locking walls for hooking the claw portions. Here, the locking portions 61a and 71a are formed as the locking walls, and the locked portions 62a and 72a are formed as the claw portions. Note that, in this example, the first holding body 71 is formed in the same shape as the first holding body 61, and the second holding body 72 is formed in the same shape as the second holding body 62.

Figure 13:
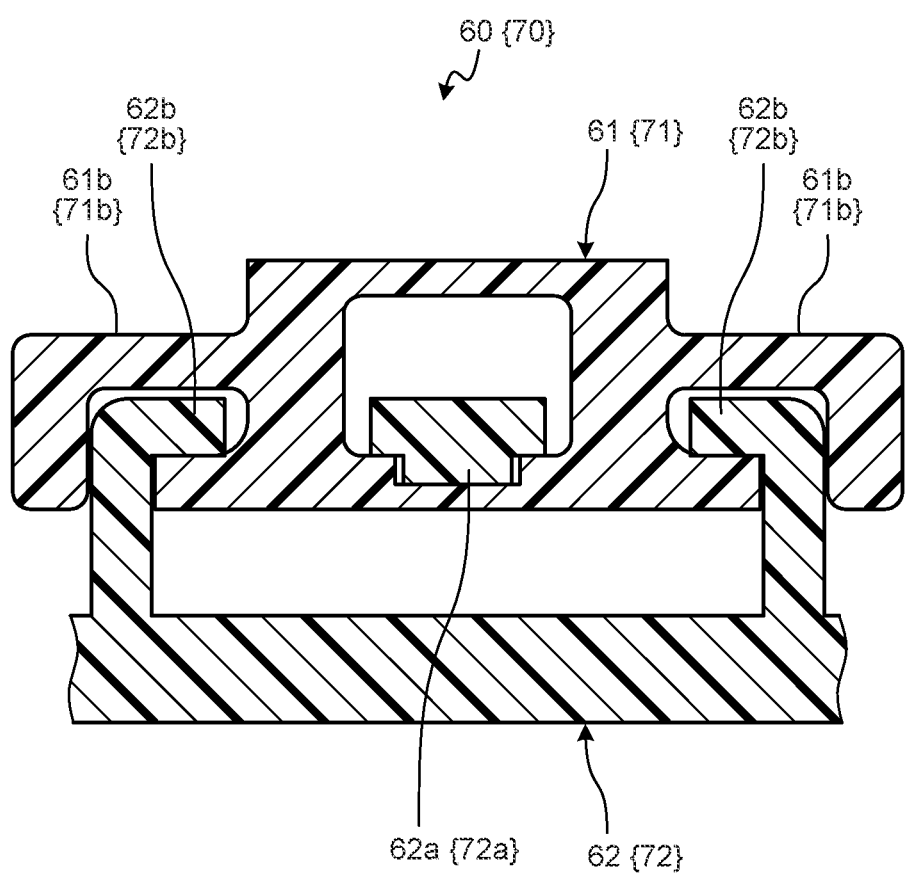
FIG. 13 is a cross-sectional view explaining guide portions and guided portions of the first holding structure and the second holding structure.

Further, the first holding bodies 61 and 71 have guide portions 61b and 71b that extend along the direction of the relative movement between the locking portions 61a and 71a and the locked portions 62a and 72a in a state where the casing 10 is attached to the installation target 500, respectively (FIGS. 8, 9, and 13). In addition, the second holding bodies 62 and 72 have guided portions 62b and 72b that are guided from the side of the opening 502 to the assembly completion position along the guide portions 61b and 71b, respectively (FIGS. 11 and 13).

The first holding structure 60 includes two pairs of guide portion 61b and guided portion 62b. In the first holding body 61, the two guide portions 61b are disposed to face each other with the locking portion 61a therebetween. In addition, in the second holding body 62, the two guided portions 62b are disposed to face each other with the locked portion 62a therebetween. Further, the second holding structure 70 includes two pairs of guide portion 71b and guided portion 72b. In the first holding body 71, the two guide portions 71b are disposed to face each other with the locking portion 71a therebetween. In addition, in the second holding body 72, the two guided portions 72b are disposed to face each other with the locked portion 72a therebetween.

Here, at least one of the first holding body 61 of the first holding structure 60 and the first holding body 71 of the second holding structure 70 is disposed at a position that can be visually recognized by the worker from the opening 502, in a state where the casing 10 is attached to the installation target 500. As a result, when the worker views the casing 10 attached to the installation target 500 from the opening 502 of the installation target 500, the worker can visually recognize at least one of the first holding body 61 and the first holding body 71 provided in the casing 10 from the opening 502. Therefore, when the worker assembles the terminal block 20 into the casing 10, the worker can easily adjust a position of at least one of the second holding body 62 and the second holding body 72 of the terminal block 20 paired with at least one of the first holding body 61 and the first holding body 71, with respect to at least one of the first holding body 61 and the first holding body 71. In addition, the worker adjusts the position of one of the second holding body 62 and the second holding body 72 paired with one of the first holding body 61 and the first holding body 71, with respect to one of the first holding body 61 and the first holding body 71, thereby easily adjusting a position of the other of the second holding body 62 and the second holding body 72 paired with the other of the first holding body 61 and the first holding body 71, with respect to the other of the first holding body 61 and the first holding body 71.

In the electric connection box 1 of this example, the first holding bodies 61 and 71 are disposed at positions that can be visually recognized by the worker from the opening 502 in a state where the casing 10 is attached to the installation target 500. Therefore, the worker can appropriately adjust at least one of the positions of the first holding body 61 and the second holding body 62 to be paired and the positions of the first holding body 71 and the second holding body 72 to be paired.

In the electric connection box 1, by adjusting the positions of the first holding body 61 and the second holding body 62 to be paired and the positions of the first holding body 71 and the second holding body 72 to be paired, the guide portions 61b and 71b and the guided portions 62b and 72b can be easily engaged with each other. In addition, in the electric connection box 1, the first holding bodies 61 and 71 and the second holding bodies 62 and 72 can be guided to the position where the locking portions 61a and 71a and the locked portions 62a and 72a can be locked (that is, the assembly completion position) by the guide portions 61b and 71b and the guided portions 62b and 72b. As described above, in the electric connection box 1 of the present embodiment, the terminal block 20 can be assembled into the casing 10 with excellent assembly workability. Since the wire harness WH of the present embodiment includes the electric connection box 1, it is possible to achieve a useful effect obtained by the electric connection box 1.

Incidentally, in the electric connection box 1, it is not preferable that the terminal block 20 is separated from the casing 10 due to the breakage of the erection body 13 in a usage environment. For this reason, in the erection body 13, by design, a required strength that does not cause breakage under the usage environment is set. On the other hand, for example, when the vehicle is scrapped, a dismantling work may be performed to remove various parts related to the vehicle. In this case, the electric connection box 1 is divided into, for example, discarded parts made of a synthetic resin and recyclable parts such as conductors. In addition, in the electric connection box 1 of this example, if the casing 10 and the holding member 40 and the terminal cover 50 of the terminal block 20 are not recycled, this is preferable because the dismantling work is facilitated even if they are damaged. Therefore, the erection body 13 is preferably formed to have a strength that is higher than the required strength of the electric connection box 1 under the usage environment and that enables breakage during the dismantling work of the electric connection box 1 for separating the terminal block 20 from the casing 10.

In the erection body 13 of this example, by design, a portion between the side of the bulging portion 13*b* and the side of the bottom wall 13*c* is formed to have a strength that enables breakage during the dismantling work. The side of the bottom wall 13*c* includes the projection portion of the erection wall 13*a*, the first holding body 61, and the first holding body 71.

The side of the bulging portion 13*b* and the side of the bottom wall 13*c* are connected by the erection wall 13*a* and the first connecting portion 13*d* described above (FIGS. 9 and 10). The first connecting portion 13*d* of this example is formed in a plate shape having a plate thickness in the facing arrangement direction of the bulging portion 13*b* and the first holding body 61, and is formed in a linear shape in which it extends in the guide direction of the guide portion 61*b* and the guided portion 62*b* to be paired.

Further, between the side of the bulging portion 13*b* and the side of the bottom wall 13*c* of this example, the end of the bulging portion 13*b* on the vertically lower side (the side of the second cover body 52) and the bottom wall 13*c* are connected by a second connecting portion 13*e* and a third connecting portion 13*f* (FIGS. 9 and 10). Each of the second connecting portion 13*e* and the third connecting portion 13*f* is formed in a plate shape having the plate thickness in the facing arrangement direction of the bulging portion 13*b* and the bottom wall 13*c*, and is formed in a dot shape (a shape whose cross-sectional area is extremely small as compared with the linear first connecting portion 13*d*).

In the erection body 13 of this example, the erection wall 13*a*, the first connecting portion 13*d*, the second connecting portion 13*e*, and the third connecting portion 13*f* are formed to have the above-mentioned design strength. Here, the plate thickness of each of the first connecting portion 13*d*, the second connecting portion 13*e*, and the third connecting portion 13*f* is reduced, and these portions are formed so as to be the starting points of breakage during the dismantling work.

As described above, the electric connection box 1 of the present embodiment can improve not only the above-mentioned excellent assembly workability but also the dismantling workability.

In the electric connection box 1 of the present embodiment, the erection body 13 is illustrated as having the bulging portion 13*b*. However, the erection body 13 does not necessarily have the bulging portion 13*b*, and may be directly connected to the assembly surface 11*a* via the erection wall 13*a*, the first connecting portion 13*d*, the second connecting portion 13*e*, and the third connecting portion 13*f*.

In the electric connection box according to the present embodiments, at least one of the first holding body of the first holding structure and the first holding body of the second holding structure is disposed at the position visually recognized by the worker from the opening, in a state where the casing is attached to the installation target. As a result, when the worker views the casing attached to the installation target from the opening of the installation target, the worker can visually recognize at least one of the first holding body of the first holding structure and the first holding body of the second holding structure provided in the casing from the opening. Therefore, when the worker assembles the terminal block into the casing, the worker can easily adjust a position of the second holding body of the terminal block paired with at least one of the first holding bodies, with respect to at least one of the first holding bodies. In addition, the worker adjusts the position, so that the worker can easily adjust the position of the second holding body paired with the other of the first holding bodies, with respect to the other of the first holding bodies. In the electric connection box, by adjusting the position, the guide portions and the guided portions of the first holding structure and the second holding structure can be easily engaged with each other. In addition, in the electric connection box, the first holding bodies and the second holding bodies can be guided to the position where the locking portions and the locked portions can be locked (that is, the assembly completion position) by the guide portions and the guided portions of the first holding structure and the second holding structure. As described above, in the electric connection box according to the present embodiments, the terminal block can be assembled into the casing with excellent assembly workability. Since the wire harness according to the present embodiments includes the electric connection box, the wire harness can achieve a useful effect that can be obtained by the electric connection box.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electric connection box comprising:
    an insulating casing;
    at least one internal electric part that is accommodated inside the casing and is electrically connected to a plurality of internal electric wires drawn from the inside to outside of the casing;
    a terminal block that is provided with at least one external electric part electrically connected to at least one external electric wire, and is assembled into an assembly surface in an outer wall of the casing;
    a first holding structure that is interposed between the assembly surface and a first outer wall surface disposed to face the assembly surface in the terminal block at an assembly completion position, and holds the terminal block on the assembly surface; and
    a second holding structure that is interposed between an erection wall erected from the assembly surface and a second outer wall surface disposed to face the erection wall in the terminal block at the assembly completion position, and holds the terminal block on the assembly surface, wherein
    the casing has a held portion to be attached to a holding portion of an installation target from an opening of the installation target,
    each of the first holding structure and the second holding structure includes a locking portion that is provided on the side of the assembly surface, a locked portion that is provided on the side of the terminal block and in which a relative movement toward the side of the opening at the assembly completion position is locked by the locking portion, a guide portion that is provided on the side of the assembly surface and extends along a direction of the relative movement between the locking portion and the locked portion in a state where the casing is attached to the installation target, and a guided portion that is provided on the side of the terminal block and is guided from the side of the opening to the assembly completion position along the guide portion, and at least one of a holding body having the locking portion and the guide portion in the first holding structure and a holding body having the locking portion and the guide portion in the second holding structure is disposed at a position visually recognized by a worker from the opening, in a state where the casing is attached to the installation target.

2. The electric connection box according to claim 1, wherein the holding bodies of each of the first holding structure and the second holding structure are disposed at a position visually recognized by the worker from the opening, in a state where the casing is attached to the installation target.

3. The electric connection box according to claim 1, wherein the holding bodies of each of the first holding structure and the second holding structure are provided in an erection body erected from the assembly surface, and the erection body has the erection wall, and is formed to have a strength that is higher than a required strength under a usage environment and enables breakage during a dismantling work for separating the terminal block from the casing.

4. The electric connection box according to claim 2, wherein the holding bodies of each of the first holding structure and the second holding structure are provided in an erection body erected from the assembly surface, and the erection body has the erection wall, and is formed to have a strength that is higher than a required strength under a usage environment and enables breakage during a dismantling work for separating the terminal block from the casing.

5. A wire harness comprising:

an insulating casing;

a plurality of internal electric wires;

at least one internal electric part that is accommodated inside the casing and is electrically connected to the plurality of internal electric wires drawn from the inside to outside of the casing;

at least one external electric wire;

a terminal block that is provided with at least one external electric part electrically connected to the at least one external electric wire and is assembled into an assembly surface in an outer wall of the casing;

a first holding structure that is interposed between the assembly surface and a first outer wall surface disposed to face the assembly surface in the terminal block at an assembly completion position and holds the terminal block on the assembly surface; and a second holding structure that is interposed between an erection wall erected from the assembly surface and a second outer wall surface disposed to face the erection wall in the terminal block at the assembly completion position and holds the terminal block on the assembly surface, wherein the casing has a held portion to be attached to a holding portion of an installation target from an opening of the installation target, each of the first holding structure and the second holding structure includes a locking portion that is provided on the side of the assembly surface, a locked portion that is provided on the side of the terminal block and in which a relative movement toward the side of the opening at the assembly completion position is locked by the locking portion, a guide portion that is provided on the side of the assembly surface and extends along a direction of the relative movement between the locking portion and the locked portion in a state where the casing is attached to the installation target, and a guided portion that is provided on the side of the terminal block and is guided from the side of the opening to the assembly completion position along the guide portion, and at least one of a holding body having the locking portion and the guide portion in the first holding structure and a holding body having the locking portion and the guide portion in the second holding structure is disposed at a position visually recognized by a worker from the opening, in a state where the casing is attached to the installation target.

* * * * *